April 21, 1953 K. W. COONS 2,635,381
FISH LURE
Filed Dec. 27, 1948 2 SHEETS—SHEET 2
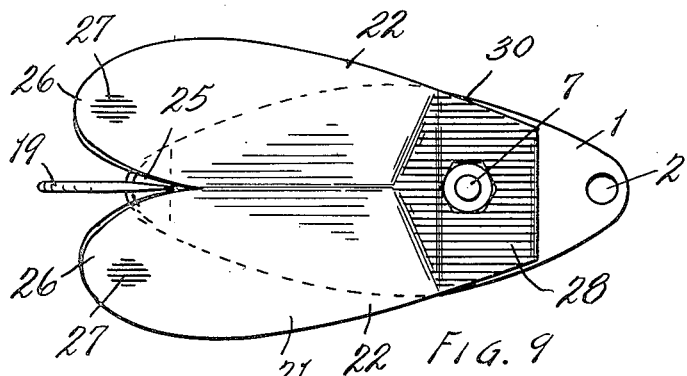
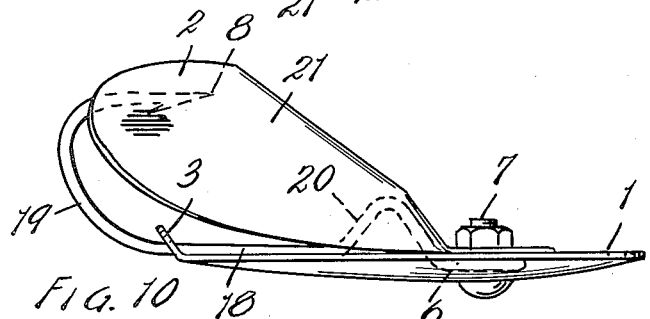
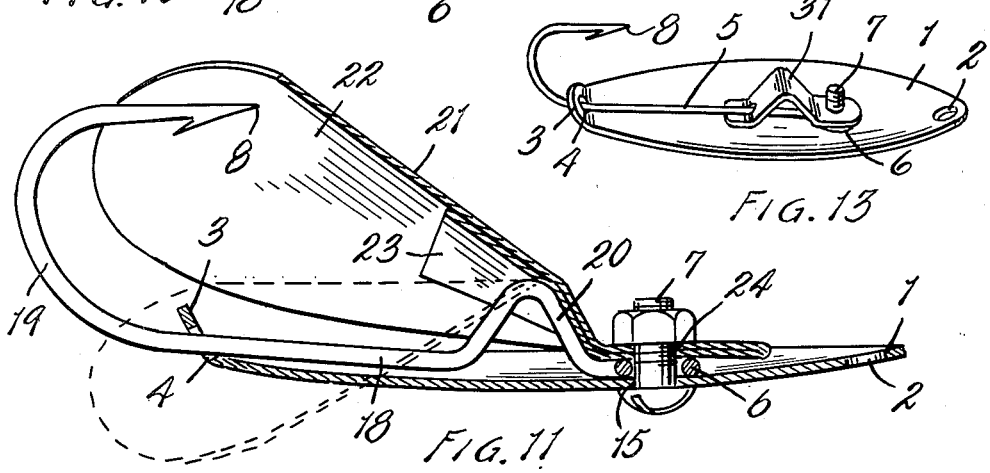
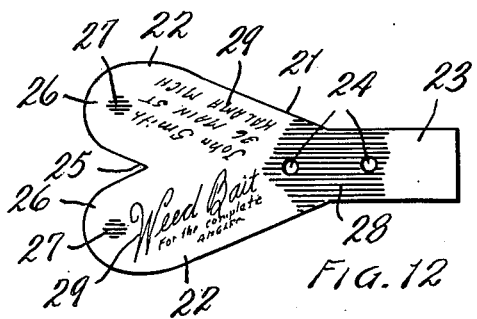
INVENTOR.
Karl W. Coons
BY
Attorney.

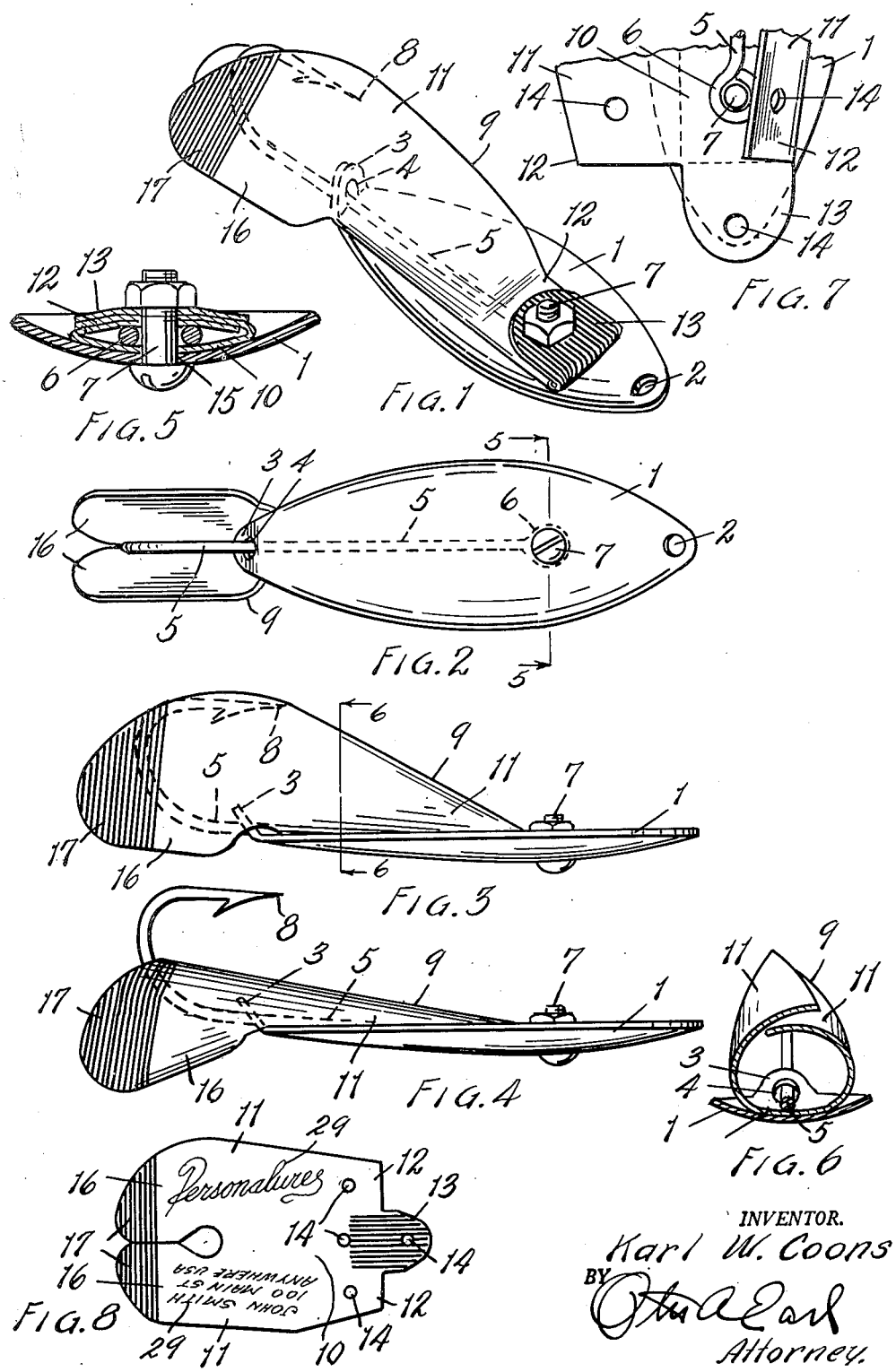

Patented Apr. 21, 1953

2,635,381

UNITED STATES PATENT OFFICE 2,635,381

FISH LURE

Karl W. Coons, Kalamazoo, Mich.

Application December 27, 1948, Serial No. 67,361

9 Claims. (Cl. 43—42.24)

This invention relates to improvements in fishing lures.

The main objects of this invention are:

First, to provide a weedless fishing lure or one in which the point is normally guarded from engagement with weeds and the like and is effective in that the guard may be easily deflected by the strike of a fish.

Second, to provide a fishing lure having these advantages which is highly attractive in appearance and effectively simulates a natural object particularly when drawn through the water.

Third, to provide a fishing lure which is capable of a wide variety of ornamentation to render it attractive and also one in which the guard may be easily provided with printing such as ornamental design, a trade-mark, advertising matter or the name of a purchaser.

Fourth, to provide a bait or lure which remains in upright position and has quite a life-like swimming or zig-zag darting movement as it is propelled through the water.

Objects relating to details and economies of the invention will appear from the description to follow. The invention is defined and pointed out in the claims.

A preferred embodiment of the invention is illustrated in the accompanying drawing, in which:

Fig. 1 is a top perspective view of a fishing lure embodying my invention.

Fig. 2 is a bottom plan view thereof.

Fig. 3 is a side elevational view with the guard in normal or erected position.

Fig. 4 is a side elevational view with the guard collapsed as by the strike of a fish.

Fig. 5 is an enlarged transverse section on a line corresponding to line 5—5 of Fig. 2.

Fig. 6 is a transverse section on a line corresponding to line 6—6 of Fig. 3.

Fig. 7 is a fragmentary plan view illustrating structural details and certain steps in assembling.

Fig. 8 is a plan view of the blank from which the guard of the preceding figures is formed with matter printed thereon and showing one type of ornamentation.

Fig. 9 is a plan view of a modified form or embodiment of my invention.

Fig. 10 is a side elevational view of the embodiment of Fig. 9.

Fig. 11 is an enlarged view partially in longitudinal section, the guard being shown in erected or normal position by full lines and in collapsed position by dotted lines.

Fig. 12 is a plan view of the guard of Figs. 9, 10 and 11 in the blank or flat with matter printed thereon.

Fig. 13 is a perspective view of a modified form of guard support.

The embodiment of my invention shown in Figures 1 to 8 inclusive comprises an elongated spoon shaped body member 1 having a line attaching eye 2 at its front end. The rear end of the body member is turned upwardly to provide an ear 3 provided with an aperture 4 through which the shank 5 of the hook is arranged. The eye 6 of the hook is disposed within the body to receive the attaching member 7. The hook at the rear end of its shank 5 is directed upwardly and forwardly to provide a forwardly directed portion. The forward end portion of this forwardly directed portion is pointed and provides a bill 8 for the hook.

The guard of my invention as illustrated in Figures 1 to 8 inclusive is formed of flexible resilient sheet material such for example as parchmentized paper. Parchmentized paper is very desirable because of its light weight and cheapness and the fact that it does not disintegrate in water. At the same time it is readily yieldable under pressure. The guard, designated generally by the numeral 9 comprises a web portion 10 and side members 11, the web portion 10 being arranged below the shank of the hook and its eye. The forward ends 12 of the side members 11 of the guard are folded inwardly into superimposed relation with each other and upon the eye portion of the hook. The web portion 10 is provided with a forwardly projecting tab 13 which is folded rearwardly upon the superimposed infolded portions 12 of the side members, the web portion 10, the portions 12 and the tab having holes 14 which align or register with the hole 15 in the body member receiving the fastener 7 which is desirably in the form of a bolt. This single fastener clamps the parts securely together while leaving the side members of the body portion free to collapse, the infolding of the portions 12 resulting in curving the forward portions of the side members into overlapping relation so that they more readily collapse, that is, one side member does not interfere with the collapsing of the other side member of the hook guard.

These guard side members project normally in front of the point of the bill of the hook to guard the same and to deflect weeds or the like therefrom and at the same time they may be readily collapsed by the strike of a fish to expose the point of the bill of the hook. The rear end portions of the upper edges of the side members 11 are movable downwardly on opposite sides of the bill of the hook from a position above the level of the bill, as shown in Figs. 1 and 3, to a position substantially below said level, as shown in Fig. 4, upon downward deflection of the side members as the result of the strike of a fish. The rear ends 16 of the guard side members in this embodiment project rearwardly of the body member and have downward extending portions extending normally below the rear end of the body as is shown in the drawing. Ornamentation is indicated on the tab portion 13 and on the rear ends of the guard side members as indicated at 17. With this arrangement the lure closely simulates the body and wings of a fly or other natural objects attractive to fish.

Further, while effective as a guard, the guard also coacts with the body to impart a swimming or zig-zag motion as it is propelled through water as by a line attached to the eye 2, thus further simulating a natural food for fish.

One of the advantages of the structure is that the guard may have printed matter thereon as indicated in Fig. 8 for ornamentation or to present the name of the owner of the lure, and this may be economically done as the printing or writing may be done directly on the paper guards.

In Figures 9 to 12 inclusive, I illustrate a modified form of my invention. In that structure the body member 1 is the same as that described. The shank 18 of the hook 19 of this embodiment is provided with an upward offset 20 which serves as a supporting abutment for the guard to be described. The eye of the hook 6 is arranged to receive the fastener 7 as in the embodiment described. In this embodiment the guard 21 is formed of flexible sheet material, such for example, as parchmentized paper and is of downwardly facing channel section providing side members 22 which project rearwardly and upwardly in front of the point of the bill 8 of the hook to normally constitute a guard therefor. In this embodiment the guard is provided with an extension 23 which is folded downwardly and rearwardly to serve as a reinforcement for the guard, the guard and its extension being provided with registering holes 24 receiving the attaching member or bolt 7 as best shown in Fig. 11. Thus arranged the guard is clamped over the hump or offset 20 so that the guard is flexibly supported in the forwardly inclined position and normally in guarding relation to the point of the hook.

The guard has a recess 25 in the top thereof to provide clearance for the bill of the hook when the guard is depressed. This also results in portions 26 resembling the ends of wings of an insect. These side members of the guard may be ornamented as at 27 and the front end thereof as indicated at 28. This guard is also adapted to receive printed or other matter as indicated at 29. In this embodiment, the guard functions much the same as that of Figs. 1 to 8 inclusive.

The lower edges of the guard as shown in Fig. 12 merge with the lines of the front portion 30 of the bait body (see Fig. 9) which further adds to the simulation of a natural object attractive to fish. The side members of the embodiment diverge downwardly so that they collapse over the rear portion of the bait body as shown in Fig. 11.

In the embodiment shown in Fig. 13, the hook shank 5 is provided with a sheet metal support 31 mounted thereon, in lieu of the offset 20. This eliminates the necessity for a specially formed hook shank. The guard coacts with the heavier body in keeping the lure in a right side up position as well as imparting the swimming or zig-zag motion thereto.

I have not attempted to illustrate other forms or embodiments of my invention, as it is believed that this disclosure will enable those skilled in the art to embody or adapt my invention as may be desired.

Having thus described my invention, what I claim as new and desire to secure by Letters Patent is:

1. A fishing lure comprising a spoon shaped body having an upturned apertured ear at its rear end, a hook having a shank disposed through said ear and terminating in an eye disposed within the body, the hook at the rear end of its shank being directed upwardly and forwardly and terminating in a forwardly directed pointed end portion constituting a bill for the hook, a thin flexible sheet-like hook guard comprising a web portion and side members, the web portion being disposed within the body below the shank of the hook, the forward ends of the side members extending inwardly into superimposed relation above the eye of the hook, said body and the superimposed portions of said guard having openings therein aligned with the eye of the hook, and a fastening element arranged through said openings and the eye of the hook, side members of the guard normally guarding the bill of the hook, said side members having upper edges disposed normally above the bill of the hook, said upper edges being movable downwardly on opposite sides of the bill from a position normally above the level of the bill to a position substantially below the said level upon downward deflection of said side members as the result of the strike of a fish.

2. A fishing lure comprising a body, a hook mounted on the body and having at its rear end an upwardly and forwardly directed portion terminating in a pointed end portion constituting the bill of the hook, and a thin flexible sheet-like hook guard comprising a web portion and side members, the web portion being secured upon the body, the forward ends of the side members extending inwardly into superimposed relation, their upper edges normally guarding the bill of the hook, said upper edges being movable downwardly on opposite sides of the bill of the hook from a position normally above the level of the bill to a position substantially below said level upon downward deflection of said side members as the result of the strike of a fish.

3. A fishing lure comprising a body, a hook fixedly mounted thereon with its bill projecting forwardly adjacent the rear of the body, a hook guard of flexible sheet material comprising a web portion and side members, the web portion being secured to the body, said side members having downwardly deflectable rearward end portions disposed on the opposite sides of the bill of the hook, said rearward end portions having longitudinally extending vertically spaced upper and lower edges, the upper edges being normally disposed on a level above the bill of the hook from a position forward of the point of the bill to a position substantially rearwardly of said point and the lower edges being disposed on a level substantially below the bill of the hook throughout substantially the entire length of said end portions, portions of said rearward portions in advance of the bill of the hook being curved inwardly facilitating the collapsing of the guard below the point of the bill of the hook, said upper edges of the side members being movable downwardly on opposite sides of the bill of the hook from a position normally above the level of said bill to a position substantially below said level upon downward deflection of said side members as the result of the strike of a fish.

4. A fishing lure comprising a body, a hook mounted on said body with its bill directed forwardly, a deflectable hook guard of flexible sheet material secured at its front end to said body and recessed forwardly from its rear edge to provide wing-like deflectable side members disposed on opposite sides of the forwardly directed bill portion of the hook and projecting above said bill portion at the sides thereof to normally guard the point of the bill and acting to maintain the lure in an upright position and coacting with the body to impart an irregular course to the lure as it is propelled through water, said wing-like side members having upper longitudinally extending edges normally disposed above the level of the bill of the hook from a position forward of the point of the bill to a position rearward thereof, the rearward end portions of the side members extending downwardly in sheet-like form from their upper longitudinal edges to a level substantially below the bill of the hook, said upper edges of the side members being movable downwardly on opposite sides of said bill from a position normally above the level of said bill to a position substantially below said level upon downward deflection of said side members as a result of the strike of a fish.

5. A fishing lure comprising a body, a hook mounted on the body with its bill directed forwardly, and a hook guard of flexible sheet material comprising downwardly deflectable side members and an intermediate web portion secured to the body, with the side members extending at the sides of the bill of the hook, said side members having rearward end portions having upper longitudinally extending edges normally disposed on a level above the bill of the hook from a position forward the point of the bill to a position rearward said point, said rearward end portions extending downwardly from their upper longitudinal edges to a level substantially below the bill of the hook and said rearward end portions diverging away from each other from adjacent their upper longitudinal edges to a level substantially below the bill of the hook, said upper edges of the side members being movable downwardly on opposite sides of the bill of the hook from a position normally above the level of said bill to a position substantially below said level upon downward deflection of the side members as the result of the strike of a fish.

6. A fishing lure comprising a concavo-convex upwardly facing body, a hook mounted on the body with the bill of the hook directed forwardly, a flexible hook guard of sheet material and of downwardly facing channel section, the front end of the guard being secured to the body with the guard in upwardly inclined relation to the body, the guard normally projecting above the bill of the hook at the opposite sides thereof and having a recess therein extending forwardly from its rear edge providing wing-like side members on the opposite sides of the bill of the hook and permitting the deflection of the side members below the point of the bill of the hook, said side members having upper longitudinally extending edges normally disposed above the level of the bill of the hook from a position forward of the point of the bill to a position rearward thereof, said side members extending downwardly in a sheet-like form from their upper longitudinal edges to a level substantially below the bill of the hook, said upper edges of the side members being movable downwardly on the opposite sides of the bill of the hook from a position normally above the level of the bill of the hook to a position substantially below said level upon downward deflection of the side members as the result of a strike of a fish.

7. A fishing lure comprising a hook having a shank having an upwardly projecting support portion adjacent its forward end and having a forwardly directed bill at its opposite end, a hook guard of flexible sheet material and of downwardly facing channel section, the front end portion of the guard being folded rearwardly and inwardly and disposed in superimposed relation on said support portion on the shank of the hook, said guard having a recess extending forwardly from its rear edge providing wing-like side members on the opposite sides of the bill of the hook, with the guard projecting normally in front of the point of the bill of the hook, said side members having upper longitudinally extending edges normally disposed above the level of the bill of the hook from a position forward of the point of the bill to a position rearward thereof, said side members extending downwardly in a sheet-like form from their upper longitudinal edges to a level substantially below the bill of the hook, said upper edges of the side members being movable downwardly on the opposite sides of the bill of the hook from a position normally above the level of the bill of the hook to a position substantially below said level upon downward deflection of the side members as the result of a strike of a fish.

8. A fishing lure comprising a body, a hook secured to the body in relatively fixed relation with the bill directed forwardly, and a thin flexible sheet-like hook guard of downwardly facing channel section secured at its front end to the body to project rearwardly from its point of attachment beyond the rear portion of the body and laterally beyond the side edges of said rear portion of the body, said guard having a recess therein extending forwardly from its rear end, said recess providing side members on the opposite sides of the bill of the hook, the top of the guard normally projecting in front of the bill of the hook, said side members having upper longitudinally extending edges normally disposed above the level of the bill of the hook from a position forward of the point of the bill to a position rearward thereof, said side members extending downwardly in a sheet-like form from their upper longitudinal edges to a level substantially below the bill of the hook, said upper edges of the side members being movable downwardly on the opposite sides of the bill of the hook from a position normally above the level of the bill of the hook to a position substantially below said level upon downward deflection of the side members as the result of a strike of a fish.

9. An as article of manufacture, a hook guard attached to a fishing lure, the lure comprising a body and a hook mounted thereon having a forwardly directed bill, the guard being formed of flexible sheet material and comprising a web portion and side members, the web portion being attached to the lure body with the forward ends of the side members folded inwardly into flat parallel overlapping superimposed relation above the web and the superimposed portions having aligned openings to receive an attaching member, and an attaching member extending through said openings, said side members having upper longitudinal edges disposed normally above the bill of the hook, said upper edges being movable downwardly on the opposite sides of the bill of the hook from a position normally above the level of the bill to a position substantially below said level upon downward deflection of said side members as the result of the strike of a fish.

KARL W. COONS.

References Cited in the file of this patent

UNITED STATES PATENTS

| Number | Name | Date |
|---|---|---|
| 719,704 | Trakel | Feb. 3, 1903 |
| 847,266 | Upton | Mar. 12, 1907 |
| 919,820 | Caldwell | Apr. 27, 1909 |
| 934,087 | Moran | Sept. 14, 1909 |
| 973,479 | Cooper | Oct. 25, 1910 |
| 1,088,475 | Stewart | Feb. 24, 1914 |
| 1,154,168 | Bosserman | Sept. 21, 1915 |
| 1,851,529 | Stapf | Mar. 29, 1932 |
| 2,319,686 | Janisch | May 18, 1943 |
| 2,423,431 | Allen | July 8, 1947 |